United States Patent
Depalov et al.

(10) Patent No.: US 9,020,262 B2
(45) Date of Patent: Apr. 28, 2015

(54) SYMBOL COMPRESSION USING CONDITIONAL ENTROPY ESTIMATION

(75) Inventors: Dejan Depalov, Boise, ID (US); Peter Bauer, Boise, ID (US); Charles A. Bouman, West Lafayette, IN (US); Jan Allebach, West Lafayette, IN (US); Yandong Guo, West Lafayette, IN (US)

(73) Assignees: Hewlett-Packard Development Company, L.P., Houston, TX (US); Purdue Research Foundation, West Lafayette, IN (US)

( * ) Notice: Subject to any disclaimer, the term of this patent is extended or adjusted under 35 U.S.C. 154(b) by 220 days.

(21) Appl. No.: 13/563,426

(22) Filed: Jul. 31, 2012

(65) Prior Publication Data
US 2014/0037210 A1    Feb. 6, 2014

(51) Int. Cl.
| | |
|---|---|
| G06K 9/34 | (2006.01) |
| G06K 9/46 | (2006.01) |
| G06K 9/62 | (2006.01) |
| G06K 9/68 | (2006.01) |
| H04N 19/13 | (2014.01) |
| H04N 19/91 | (2014.01) |

(52) U.S. Cl.
CPC ............ H04N 19/91 (2014.01); G06K 9/342 (2013.01); G06K 9/6219 (2013.01); G06K 9/6807 (2013.01); H04N 19/13 (2014.01)

(58) Field of Classification Search
CPC .......... G06K 9/00456; G06K 9/00463; G06K 9/348; G06K 9/34; G06K 2209/01; H04N 7/26244; H04N 7/30; H04N 7/26106; G06T 9/005; H03M 7/4006
USPC ......... 382/176, 177, 232, 233, 243, 246, 247, 382/305
See application file for complete search history.

(56) References Cited

U.S. PATENT DOCUMENTS

| | | | |
|---|---|---|---|
| 5,604,495 A | 2/1997 | Watanabe | |
| 5,635,931 A | 6/1997 | Franaszek et al. | |
| 5,635,932 A * | 6/1997 | Shinagawa et al. | 341/51 |
| 5,703,907 A * | 12/1997 | James | 375/240 |
| 6,026,198 A * | 2/2000 | Okada | 382/247 |
| 6,658,151 B2 * | 12/2003 | Lee et al. | 382/229 |
| 7,146,053 B1 * | 12/2006 | Rijavec et al. | 382/233 |
| 7,340,103 B2 * | 3/2008 | Smirnov | 382/245 |

(Continued)

OTHER PUBLICATIONS

Hu, K. et al. "MC-JBIG2: an Improved Algorithm for Chinese Textual Image Compression." < http://www.springerlink.com/content/13k6145327287707/ > pp. 271-284; vol. 13; Issue: 4. Aug. 2010.

(Continued)

*Primary Examiner* — Kanjibhal Patel
(74) *Attorney, Agent, or Firm* — Brooks, Cameron & Huebsch, PLLC

(57) ABSTRACT

The present disclosure includes a system and method for symbol compression using conditional entropy estimation. One method for symbol compression using conditional entropy estimation includes approximating a quantity of symbol encoding bits for a number of symbols using a conditional entropy estimation. Dictionary entries are generated from the number of symbols so as to minimize a total bit-stream quantity. The total bit-stream quantity includes at least the approximated quantity of symbol encoding bits and a quantity of dictionary entries encoding bits. The symbols are encoded using the dictionary entries as a reference.

15 Claims, 7 Drawing Sheets

(56) References Cited

U.S. PATENT DOCUMENTS

| | | | | |
|---|---|---|---|---|
| 7,369,709 | B2* | 5/2008 | Hsu et al. | 382/248 |
| 7,554,467 | B2 | 6/2009 | Thomas | |
| 7,831,099 | B2* | 11/2010 | Sekino | 382/218 |
| 7,907,783 | B2* | 3/2011 | Ohk et al. | 382/218 |
| 7,936,932 | B2* | 5/2011 | Bashyam et al. | 382/232 |
| 8,356,060 | B2* | 1/2013 | Marwah et al. | 707/812 |
| 2009/0052788 | A1 | 2/2009 | Gross et al. | |

OTHER PUBLICATIONS

Lee, Dar-Shyang. et al. "Information Extraction from Symbolically Compressed Document Images." < http://www.google.co.in ... > pp. 176-182. Apr. 1999.

M. Figuera, C. A. Bouman, and J. Yi, "A new approach to jbig2 binary image compression," in Proceedings of SPIE, 2007.

M. J. J. Holt, "A fast binary template matching algorithm for document image data compression." in Pattern Recognition'88, 1988, pp. 230-239.

W. Pratt, P. Capitant, W.-H. Chen, E. Hamilton, and R. Wallis, "Combined symbol matching facsimile data compression system." in Proceedings of the IEEE, 1980, pp. 786-796.

Wikipedia, "JBIG2," Nov. 13, 2011, <http://web.archive.org/web/20111113091157/http://en.wikipedia.org/wiki/JBIG2>.

Wikipedia, "k-means clustering," Sep. 28, 2011, <http://web.archive.org/web/20110928005235/http://en.wikipedia.org/wiki/K-means_clustering>.

Y. Ye and P. C. Cosman, "Dictionary design for text image compression with jbig2." IEEE Transactions on Image Processing, pp. 818-828, 2001.

Y. Ye and P. C. Cosman, "Fast and memory efficient text image compression with jbig2." IEEE Transactions on Image Processing, pp. 944-956, 2003.

Y. Ye, D. Schilling, P. C. Cosman, and H. H. Ko, "Symbol dictionary design for the jbig2 standard." in Data Compression Conference'00, 2000, pp. 33-42.

Arps, R. B. and Truong, T. K., "Comparison of international standards for lossless still image compression," Proc. of the IEEE 82, 1994, pp. 889-899.

Cao, G. et al., "High dimensional regression using the sparse matrix transform (SMT)," Acoustics Speech and Signal Processing (ICASSP), 2010 IEEE International Conference, 2010, pp. 1870-1873.

Elad, M. and Datsenko, D., "Example-based regularization deployed to super-resolution reconstruction of a single image," Comput. J. 52, Jan. 2009, pp. 15-30.

Bad, M. et al., "Low bit-rate compression of facial images," IEEE Trans. On Image Processing 16, No. 9, 2007, pp. 2379-2383.

Fumitaka, O. et al., "JBIG2—the ultimate bi-level image coding standard," in Proc. of IEEE Int'l Conf. on Image Proc., 140-143 (2000).

Howard, P. G. et al., "The emerging JBIG2 standard," IEEE Trans. on Circuits and Systems for Video Technology 8, 1998, pp. 838-848.

International Telecommunication Union (ITU), "Information technology—Lossy/lossless coding of bi-level images," JBIG2 Recommendation International Standard, Feb. 2000, ITU-T Recommendation T.88.

Jin, P. et al., "Implicit Gibbs prior models for tomographic reconstruction," in the 46th Asilomar Conference on Signals, Systems and Computers, Nov. 2012, pp. 613-616.

Ortego, A. and Ramehandran, K., "Rate-distortion methods for image and video compression," IEEE Signal Proc. Magazine 15, 23-50 (1998).

Rubinstein, R. et al. "Dictionaries for sparse representation modeling," Proc. of the IEEE 98, 2010, pp. 1045-1057.

Ruf, M. J. and Modestino, J. W., "Operational rate-distortion performance for joint source and channel coding of images," IEEE Trans. on Image Processing 8, 1999, pp. 305-320.

Zhang, Q. and Danskin, J. M., "Entropy-based pattern matching for document image compression," in Proc. of IEEE Int'l Conf. on Image Proc., 1996, pp. 221-224.

Zhang, Q. et al., "A codebook generation algorithm for document image compression," in 1997 IEEE Data Compression Conf. (DCC), 1997, pp. 300-309.

* cited by examiner

SYMBOL COMPRESSION USING CONDITIONAL ENTROPY ESTIMATION

BACKGROUND

Digital content can be displayed electronically, such as by a computer monitor, television, or mobile device, or printed to physical print media, such as paper. The amount and use of digital content is increasing, including text. Text can be implemented in various digital content formats, including as a binary document image. Some of the advantages of digital content over physical print media include ease of electronic transmission and electronic storage. However, electronic transmission can be constrained by bandwidth considerations, and electronic storage can be constrained by storage capacity considerations. Compressing digital content can reduce electronic transmission bandwidth and/or reduce the electronic storage capacity used. Various image compression standards have been promulgated to facilitate compatibility across a computing system, e.g., a plurality of computing devices. As such, efficient digital content compression techniques can be constrained by compatibility with image compression standard(s).

DETAILED DESCRIPTION

Figure 1A:
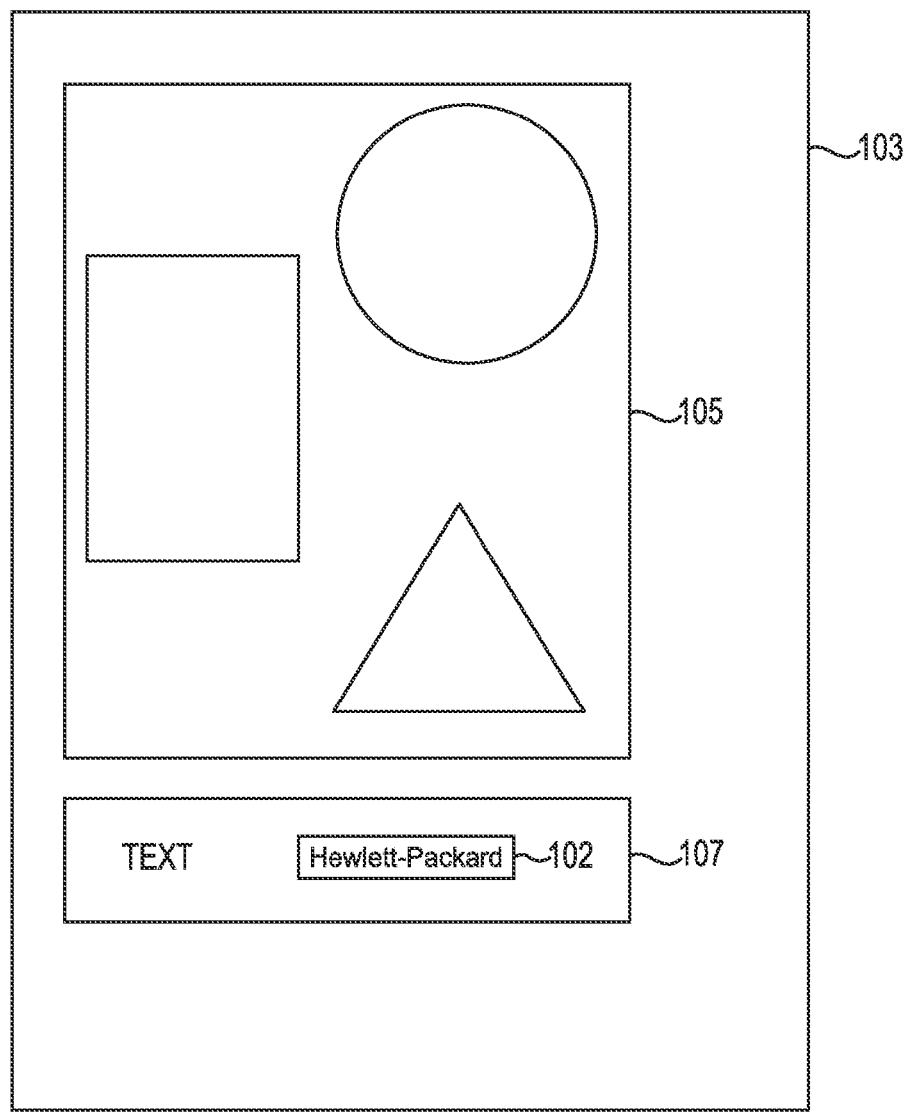
FIG. 1A is a diagram illustrating text region extraction according to an example of the present disclosure.

Ever increasing amounts of digital content, e.g., scanned documents, are driving the need for novel data compression techniques that enable more efficient storage and electronic transmission of scanned documents. File size is one of the major factors affecting bandwidth and electronic storage capacity. Scanned documents are frequently implemented in a bi-tonal mode, e.g., black or white pixel value, and compressed in a format compatible with the one of several file standards, e.g., a second generation binary image compression standard developed by the Joint Bi-level Image Experts Group (JBIG2). This type of codec, e.g., a computing system or method capable of encoding and decoding digital content, can achieve high compression rates while retaining the pertinent information of the original document.

JBIG2 can have a higher compression ratio than wavelet-based Joint Photographic Experts Group (JPEG) standards, such as ISO/IEC 15444-1, T-800. The JBIG2 standard is widely used for binary document image compression and outperforms the conventional facsimile encoding standards, such as T.4, T.6, and T.82 (JBIG1). For the binary document image compression, a JBIG2 encoder encodes a subset of binary patterns (referred to as dictionary entries), then encodes the rest of the binary patterns (referred to as symbols) using the dictionary entries as reference. In addition, while other facsimile standards support only lossless mode, JBIG2 supports both lossless and lossy modes. JBIG2 encoding can be achieved by a combination of the following operations: image segmentation, symbol extraction, dictionary construction and entropy encoding.

An image, such as a symbol, e.g., letter, numbers, characters, etc., can be represented digitally by a grid of pixels. Each pixel in the grid can have one value, e.g., 1, if the symbol is present at the location of the pixel in the grid, and have a different value, e.g., 0, if the symbol is not present at the location of the pixel in the grid. The value of each pixel in the grid can be stored and/or transmitted to convey the contents of the image. However, such a brute force method using values for every pixel in a grid of pixels comprising the image involves a relatively large quantity of digital information corresponding to each image, e.g., corresponding to each symbol.

One previous approach or method to compress digital content describing a symbol other than JBIG2 involves transmitting a dictionary entry, e.g., a known symbol, and only values of pixels of the image that are different from that of the dictionary entry. For example, rather than sending all pixel values of a grid of pixels corresponding to a "t" character, an indication of the symbol being the "t" dictionary entry can be used, along with any pixel differences in the image from the "t" dictionary entry, e.g., standard "t" symbol. The differences might include, for example, the horizontal crossing of the "t" in the present image being higher or lower than that of the "t" dictionary entry symbol used as the reference character, or the tail at the bottom of the "t" symbol of the present image being straight versus curved, etc.

According to embodiments of the present disclosure, symbol pixel values are being encoded rather than the difference, e.g., between a symbol and a dictionary entry. The dictionary entry is used to skew the probability, e.g., usually making the probability of the symbol pixel larger. By this strategy, fewer bits to encode the symbol are used compared to encoding the symbol without using the dictionary entry. The dictionary may be considered as several encoders, and these encoders determine how to encode the symbol.

Some previous approaches for compression of symbols are based on the assumption that the more similar a given symbol is to a given dictionary entry the fewer the number of bits needed to encode it. Based on these measures, symbols are then clustered according to their similarity. Some standard classification algorithms, such as K-means or minimum spanning tree, are used to cluster the symbols. However, similarity measurement can be a sub-optimal estimate of the number of bits needed to encode a given symbol using given dictionary entry.

Basing a compression technique on use of dictionary entries so that symbols can be described by their difference from a dictionary entry involves storing and/or transmitting the dictionary entries to be used at the receiving end. One would expect symbols being compressed would more closely match a dictionary entry where more dictionary entries are used, so that less difference information per symbol is needed to describe the symbol with respect to a dictionary entry. However, use of more dictionary entries involves transmitting and/or storing the digital information describing the greater quantity of dictionary entries. Having to transmit and/or store more information concerning dictionary entries reduces effective overall compression efficiency.

It can be hard to get the optimal dictionary size using the previous approaches. During a dictionary construction procedure of some previous approaches, the number of dictionary entries is decided by an empirical threshold value. However, the optimal threshold values for different images can be different. That is, a threshold value which is good for one image may generate poor result for another image.

According to the present disclosure, a novel conditional entropy estimation is used to approximate the number of bits needed by an encoder, e.g., JBIG2 encoder, to encode a given symbol using its associated dictionary entry, as is described in further detail below. Conditional entropy is the lower bound of the number of bits needed by an encoder, e.g., JBIG2 encoder, to encode a given symbol. In information theory, conditional entropy quantifies the amount of information needed to describe the outcome of one random variable given that the value of another random variable is known. With respect to this disclosure, conditional entropy refers to a number of bits needed by a JBIG2 encoder to encode a given symbol using a given dictionary entry, as is described in further detail below. Conditional entropy estimation refers to an estimate of the conditional entropy, for example, that may be determined more efficiently, such as in less time and/or using fewer computational resources.

The document image compression techniques provided herein determine the parameters associated with the compression from the image, e.g., through the conditional entropy estimation, instead of utilizing a predetermined threshold employed by some previous approaches. A clustering algorithm is used to minimize the conditional entropy within the cluster, rather than simply put similar symbols into a same cluster employed by some previous approaches. Optimizing the dictionary construction in this manner can result in smaller file sizes. Some advantages of the methods of the present disclosure over previous approach(es) include determining the quantity encoding bits prior to encoding of the symbols and having a better estimation of the dictionary size, which can result in larger compression ratios by minimizing distortion.

FIG. 1A is a diagram illustrating text region extraction according to an example of the present disclosure. Digital content 103 can be an image, for example. The digital content 103 can involve a page, document, etc., and can include a number of non-text regions 105 and a number of text regions 107. A non-text region 105 can be a picture, for example, and text regions 107 can include a story associated with the picture and/or a caption associated with the picture. The digital content 103 can be generated, for example, by a digitizing device such as a computing system, fax machine, copier, scanner, and the like, capable of producing a binary document image.

The binary document image can be segmented into text regions 107 and non-text regions 105. The text regions can contain repeated patterns. As used herein, pattern means a portion of an image, and can be denoted by a binary vector. Usually, the patterns are (but not necessarily) text, such as letters, numbers, ASCII characters, etc. Patterns are referred to as symbols herein. The text region(s) 107 can include input text 102 comprising one or more symbols. Different coding schemes can be used to encode different types of regions.

Figure 1B:
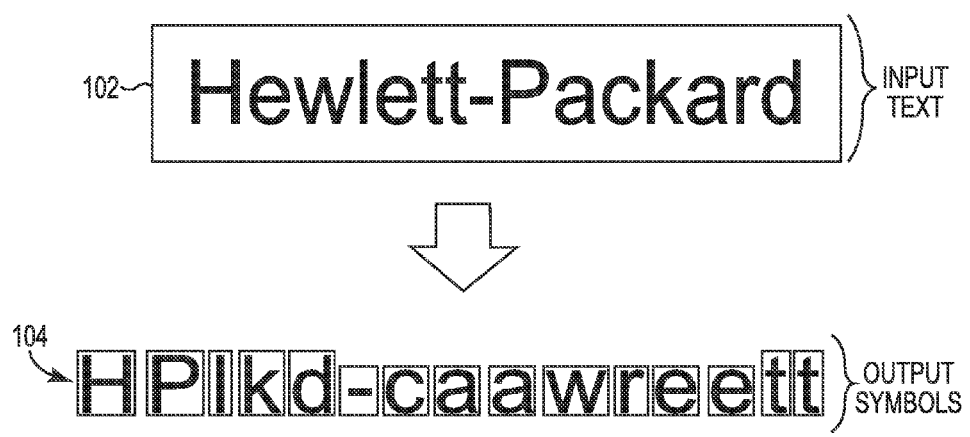
FIG. 1B is a diagram illustrating symbol extraction according to an example of the present disclosure.

FIG. 1B is a diagram illustrating symbol extraction according to an example of the present disclosure. The input text 102 can be a sequence of symbols, such as the name "Hewlett-Packard" comprising various capital letter, small letters, and a hyphen character. Individual output symbols 104 can be extracted from the input text 102. The symbols can be extracted and stored as individual binary patterns. The extracted symbols can be ordered/re-ordered, such as according to their position in the input text and/or in the text region 107. In some cases, ordering/re-ordering symbols can reduce the quantity of encoding bits to encode the symbols, e.g., in the range of 1-3%. For example, the extracted symbols can be re-ordered after optimal dictionary design and before entropy encoding of the symbols. However, embodiments are not so limited, and extracted symbols can be ordered and/or re-ordered at other times during a symbol compression process.

Symbols can be determined, for example, by finding connected components in a binary image. The connected components can be the vertical, horizontal, and/or other strokes, comprising a particular letter, number or character. Further symbol-defining criteria may be used, for example, with respect to cursive fonts.

Figure 1C:
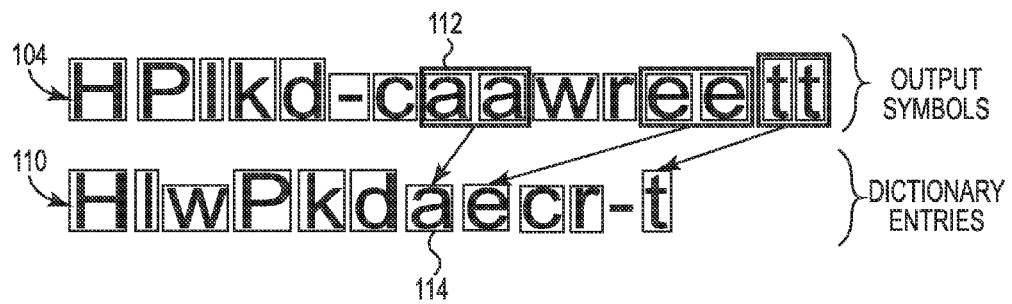
FIG. 1C is a diagram illustrating dictionary construction according to an example of the present disclosure.

FIG. 1C is a diagram illustrating dictionary construction according to an example of the present disclosure. A dictionary can be constructed that contains an entry associated with each symbol in the document, e.g., output symbols 104. Each dictionary entry 110 can represent more than one symbol in the document and/or page. For example, the output symbols 104 include duplicate letters "a" shown at 112 in FIG. 1C, which can be associated with the same dictionary entry for "a" 114. Similarly, each of the duplicate "e" characters of the output symbols 104, and each of the duplicate "t" characters can be associated with a same dictionary entry.

Symbols can differ slightly, such as due to errors or noise in the digital content comprising a symbol. For example, one letter "H" in a document can be slightly different than another "H" in the document, but each may be associated with the same dictionary entry.

Once the dictionary is constructed of one or more dictionary entries, the dictionary entries can be stored as part of an encoded JBIG2 file. The dictionary entries are transmitted and/or stored along with the coded symbols in a JBIG2 compliant file. The dictionary entries can be used by a decoder for decompression of the encoded symbols. Each symbol can be extracted from the document, encoded using the dictionary entries, and stored in a JBIG2 standard compliant file. In a lossy encoder, symbol encoding is done by simply encoding the index of the dictionary entry, while in a lossless coder, the dictionary entry is used, e.g., as a reference, along with an arithmetic or other entropy-based coder to capture differences between an encoded symbol and an associated dictionary entry.

Two categories of entropy encoders used in image compression standards are Huffman coding and arithmetic coding. The JBIG2 standard supports both Huffman coding and arithmetic coding. Huffman coding uses a fixed probability table, e.g., code table. Arithmetic coding uses a dynamic probability estimation strategy. Arithmetic coding can be more complex to implement, but can have advantages that include high compression ratio.

Arithmetic coding can be implemented by a variety of coding methods. The JBIG2 standard uses a MQ-coder. A first generation JBIG standard (JBIG1) uses a QM-coder. Other kinds of arithmetic coding methods include Q-coder and M-coder. The symbol compression using conditional entropy estimation methods of the present disclosure can be extended to other arithmetic entropy coding methods, e.g., other than JBIG2 standard using a MQ-coder, such as QM-coder, Q-coder, and/or M-coder by modifying the template (neighborhood pixels in the symbol bitmap and neighborhood pixels in the dictionary entry bitmap) in the hash table to get a new probability estimation, which can be used to obtain the total number of bits estimation.

For the Huffman coding methods, the conditional probability function, e.g., hash table in Eqs. (12), (13), does not have to be trained. A fixed probability table can be used, such as a same probability table as is used for Huffman coding. The total number of bits estimation can be obtained for Huffman coding.

Some JBIG2 encoders (also referred to herein as a "coder") can achieve better compression by constructing better dictionary entries, and/or by using those dictionary entries more effectively. For example, a larger dictionary can reduce the number of bits required for lossless encoding of each symbol because each dictionary entry can more precisely match a particular symbol. However, a larger dictionary can also increase the number of bits required to encode the dictionary itself, so coder designs attempt to balance these two objectives. Even if the dictionary is fixed, an encoder can improve compression by more optimally selecting the dictionary entry for each new symbol. Each symbol can be encoded using the dictionary entry that produces the lowest number of bits in the encoded output for greatest efficiency in compression ratio. However, this operational rate-distortion approach may not be practical since it can require too much computation and time to accomplish the computations.

Therefore, a JBIG2 coder can use a more computationally efficient method to match each symbol to a dictionary entry. Some previous coding approaches make the assumption that the more similar a symbol is to a given dictionary entry, the smaller the number of bits needed to encode it. Dissimilarity measurement in previous JBIG2 compression approaches includes Hamming distance (also known as XOR) and weighted Hamming distance (also known as WXOR). According to these previous approaches, the symbols are clustered into groups according to these dissimilarity measurements, for example, using K-means clustering or minimum spanning tree.

In this disclosure, a robust and novel dictionary construction method for JBIG2 document image compression is disclosed. The disclosed approach is a fast method to estimate the number of bits required to encode the symbol using its associated dictionary entry, which is much more accurate than the previous approaches. The disclosed approach is based on the estimation of the conditional entropy of the symbol conditioned on its associated dictionary entry. The disclosed method is distinguished from previous approaches using cross entropy as the dissimilarity measurement. However in these previous approaches, cross entropy is obtained, for example, by a 3×3 fixed filter applied on a difference map between symbol and dictionary entry bitmap. Such previous approach entropy estimations are merely a special case of previous WXOR methodologies.

In contrast, the conditional entropy estimation (CEE) approach of the present disclosure learns the document image property in a training procedure to achieve much more accurate estimation. In addition, the CEE is used to design the dictionary so as to minimize the number of bits to encode the entire binary document image, e.g., symbols, dictionary entries, indices, and overhead information. The compression methods and encoders of the present disclosure can result in a dictionary design that dramatically improves the lossless JBIG2 compression ratio. Furthermore, the compression methods and encoders of the present disclosure can be efficient enough to be used in embedded systems, such as multi-function printers. The dictionary design approach of the present disclosure can be applied for other dictionary-based lossless image encoding systems, e.g., Lempel-Ziv-77 (LZ77) scheme, and/or Lempel-Ziv-77 (LZ78) scheme, among others.

The symbol compression method of the present disclosure utilizes a conditional entropy estimator (CEE) technique that is computationally efficient for computing an accurate estimate of the number of bits required by a JBIG2 encoder to encode a given symbol using a given dictionary entry. Additionally, a computationally efficient approach is described to incorporate the CEE technique into a JBIG2 encoder in such a way that the overall bit rate required to encode a binary page is reduced relative to previous approaches. The present approach to the design of an encoding dictionary that uses CEE in order to minimize the overall number of bits required to encode both the symbols and the dictionary entries is described.

Compared to previous dictionary construction approaches, the dictionary design disclosed herein improves the lossless JBIG2 compression ratio in the range of approximately 10% to 35%. Moreover, the bit-stream generated is still compatible with standard JBIG2, and is efficient enough to be used in embedded systems such as multi-functional printers, and other computing systems. The dictionary design method of the present disclosure is suitable for dictionary-based lossless and lossy image encoding systems. Additionally, a computationally efficient approach is described to incorporate the CEE technique into a JBIG2 encoder in such a way that the overall bit rate required to encode a binary page is reduced relative to previous approaches.

The symbol compression using the conditional entropy estimation method of the present disclosure is disclosed by discussion of text region compression. However, embodiments of the present disclosure are not so limited, and the presently disclosed methods can be modified and applied to regions having digital content other than symbols and/or to digital content comprising other than binary pixel data and/or to formats compliant to standards other than JBIG2. However, the following discussion to illustrate the methods and apparatus of the present disclosure are provided as they may be applied to JBIG2 encoding.

A JBIG2 encoder can extract a sequence of symbols from the text region and encode the symbols using a dictionary containing dictionary entries. More specifically, let $\{S_i\}_{i=1}^{N}$ denote the N symbols that are extracted from the digital content, e.g., document. Each symbol, Si, can contain a bit map, location, and size information of the $i^{th}$ symbol on the page. Each symbol can be encoded using an associated dictionary entry, $D_j$, selected from a complete dictionary $D=\{D_i\}_{i=1}^{M}$, where M is the number of entries in the dictionary.

Each symbol, Si, can be mapped to a corresponding dictionary entry, Dj. This mapping can be denoted by the function j=f(i). The choice of this function, f(i), affects the compression efficiency since a good mapping will result in a corresponding dictionary entry $D_{f(i)}$ that accurately represents the symbol Si, which can result in a lower bit rate for encoding. The following discussion considers lossless JBIG2 encoding, so that all mappings result in the same quality. However, poor mappings can severely increase the bit rate, and good mappings can substantially reduce the bit rate.

The bit rate used to encode a set of symbols can be approximated using the following formula:

$$R_t(D, f) \approx \sum_{i=1}^{N} [R_s(S_i \mid D_{f(i)}) + C_1 + \log_2(M)] + \sum_{j=1}^{M} [R_d(D_j) + C_2] \quad (1)$$

where the first summation represents the bits used to encode the symbols, and the second summation represents the bits used to encode the dictionary.

In the first sum, the term $R_s(S_i \mid D_{f(i)})$ represents the bits to encode the binary bitmap of the symbol Si using the dictionary entry $D_{f(i)}$, and the term C1 is a constant that denotes the overhead (in bits) for encoding the symbol's width, height and position; and the term $\log_2(M)$ accounts for the bits to encode the index of the dictionary entry.

In the second sum, the term $R_d(D_j)$ represents the bits to encode the binary bitmap of the dictionary entry Dj, and the term C2 is a constant that denotes the overhead (in bits) for encoding the dictionary entry's width and height. For lossless JBIG2 encoding, compression ratio is optimized by minimizing the total number of bits in the encoding. For a given dictionary, D, the total number of bits can be minimized by selecting the best dictionary entry for each symbol. Formally, this can be expressed as $$f^* = \operatorname*{argmin}_{f} \sum_{i=1}^{N} [R_s(S_i \mid D_{f(i)}) + C_1 + \log_2(M)] \quad (2)$$

Since each f(i) in Eq. (2) only depends on a single value of Rs(Si|Df(i)), the index of the best dictionary entry for the symbol Si can be given by $$f^*(i) = \operatorname*{argmin}_{j} R_s(S_i \mid D_j) \quad (3)$$

However, computing the precise value of $R_s(S_i \mid D_j)$ for each symbol, Si, can be too computationally expensive to be practical, because to determine the precise value of $R_s(S_i \mid D_j)$ involves running the JBIG2 encoder to encode the symbol Si using the dictionary entry Dj, and to encode all the symbols which have smaller index than the index of Si. Therefore, $R_s(S_i \mid D_j)$ can be replaced in Eq. (3) with an accurate approximation $\tilde{R}_s(S_i \mid D_j)$, which can be calculated efficiently. Using the substitution, the index of the best dictionary entry can be obtained for the symbol Si by:

$$\tilde{f}^*(i) = \operatorname*{argmin}_{j} \tilde{R}_s(S_i \mid D_j) \quad (4)$$

For some previous approaches, selecting a dictionary entry involved minimizing dissimilarity measurements between the symbol Si and the dictionary entry Dj. Two dissimilarity measurements used in previous JBIG2-compliant approaches include Hamming distance, known as XOR, and weighted Hamming distance, known as WXOR. However, neither XOR nor WXOR are good estimators to Rs, the number of bits used to encode the symbol using the associated dictionary entry. For one experimental example image, the correlation between the number of bits Rs and dXOR was found to be in the range of only 0.4215, and the correlation between Rs and dWXOR was found to be in the range of 0.5410.

According to various embodiments of the present disclosure, a more accurate approximation of Rs(Si|Dj) can be made using the presently-disclosed methods using conditional entropy estimation (CEE). An approximation using CEE can estimate the information quantities contained in the symbol Si conditioned on its associated dictionary entry Dj, and use the estimation to approximate Rs(Si|Dj). For the same experimental example image mentioned above, the correlation between CEE and the number of bits Rs was found to be in the range of 0.9832.

Figure 2:
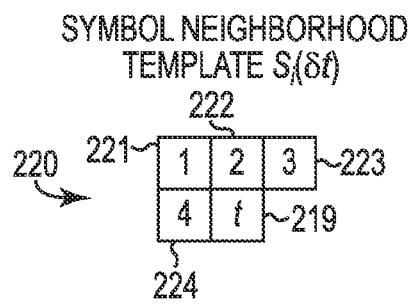
FIG. 2 is a diagram illustrating a symbol neighborhood according to an example of the present disclosure.
Figure 3:
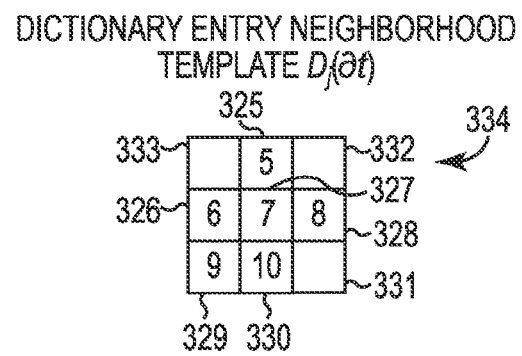
FIG. 3 is a diagram illustrating a dictionary entry neighborhood according to an example of the present disclosure.

FIG. 2 is a diagram illustrating a symbol neighborhood template according to an example of the present disclosure. FIG. 3 is a diagram illustrating a dictionary entry neighborhood template according to an example of the present disclosure. Conditional entropy estimation (CEE) can include estimating the conditional probability of the symbol pixel $S_i(t)$ conditioned on its context pixels, Ai,f(i)(t). The context pixels Ai,f(i)(t) consist of two pixel templates, the symbol neighborhood template $S_i(\delta t)$, 220 shown in FIG. 2, and the dictionary neighborhood $D_j(\partial t)$, shown in FIG. 3. The symbol neighborhood template 220 is denoted by $S_i(\delta t)$ and includes four causal-neighborhood pixels of $S_i(t)$ in $S_i$. The definition of δt is:

$$\delta t = \{(t_\alpha-1, t_\beta-1), (t_\alpha-1, t_\beta), (t_\alpha-1, t_\beta+1), (t_\alpha, t_\beta-1)\} \quad (8)$$

where the parameter $t=(t_\alpha, t_\beta)$ is used to denote the two-dimension coordinates, with $t_\beta$ being the horizontal coordinate, and $t_\alpha$ being the vertical coordinate. FIG. 2 shows the symbol pixel $S_i(t)$ at 219. The four causal neighborhood pixels of $S_i(t)$ in $S_i$ include pixel 1 located diagonally above and to the left of the reference symbol shown at 221 in FIG. 2, pixel 2 above the reference symbol shown at 222, pixel 3 located diagonally above and to the right of the reference symbol shown at 223, and pixel 4 to the left of the reference symbol shown at 224 in FIG. 2. The symbol bitmap $S_i$ is constrained to have the same size as its potential dictionary entry $D_{j'}$.

The other template is denoted by $D_j(\partial t)$, which contains six non-causal neighborhood pixels of $D_j(t)$, in $D_{j'}$. The definition of ∂t is:

$$\partial t = \{(t_\alpha-1, t_\beta), (t_\alpha, t_\beta-1), (t_\alpha, t_\beta), (t_\alpha, t_\beta+1), (t_\alpha+1, t_\beta-1), (t_\alpha+1, t_\beta)\} \quad (9)$$

FIG. 3 shows the dictionary entry neighborhood template 334 for the dictionary entry associated with the symbol being encoded. The dictionary entry neighborhood template 334 includes 6 pixels of interest, including pixel 7 as the center pixel of the dictionary entry and shown at 327 in FIG. 3, pixel 5 located above the center pixel 325 in FIG. 3, pixel 6 located to the left of the center pixel as shown 326, pixel 8 located to the right of the center pixel as shown at 328, pixel 9 located diagonally below and to the left of the center pixel as shown at 329, and pixel 10 located below the center pixel as shown at 330 in FIG. 3. Pixel 333 (located above and to the left of the center pixel), pixel 332 (located above and to the right of the center pixel), and pixel 331 (located below and to the right of the center pixel) are not utilized in some embodiments of estimating conditional entropy according to the present disclosure.

The information contained in the symbol pixel Si(t) conditioned on its context pixels is determined as:

$$\hat{I}_s(S_i(t) \mid A_{i,f(i)}(t)) = -\log_2 \hat{P}_s(S_i(t) \mid A_{i,f(i)}(t)) \quad (10)$$

where $\hat{P}_s(S_i(t) \mid A_{i,f(i)}(t))$ is the conditional probability estimation of the symbol pixel $S_i(t)$ conditioned on the context pixels $A_{i,f(i)}(t)$. The term $\hat{I}_s(S_i(t) \mid A_{i,f(i)}(t))$ is the estimation of the information quantities of $S_i(t)$ conditioned on $A_{i,f(i)}(t)$.

The approximation of Rs(Si|Df(i)) can be obtained by the summation in Eq. (11) below. The number of bits to encode the symbol bitmap Si using associated dictionary entry bitmap Df(i) is close to the information contained in the symbol Si conditioned on the associated dictionary entry bitmap Df(i). The symbol pixels are assumed to be conditionally independent conditioned on Ai,f(i)(t).

$$\tilde{R}_s(S_i \mid D_{f(i)}) = \sum_{t \in \{0, \ldots W_i^s-1\} \times \{0, \ldots h_i^s-1\}} \hat{I}_s(S_i(t) \mid A_{i,f(t)}(t)) \quad (11)$$

Conditional probability estimation is estimating $P_s(S_i(t)|A_{i,f(i)}(t))$. The probability of Si=0 conditioned on Ai,f(i)(t) is assumed to be determined by the ten binary values of Ai,f(i)(t) only. However, embodiments of the present disclosure are not limited to the ten binary values of Ai,f(i)(t) used for this description. The conditional probability estimation $\hat{P}_s(S_i(t)|A_{i,f(i)}(t))$ is achieved by constructing a function, of which the input is the ten binary pixel values of Ai,f(i)(t), and the output φ is the probability value of Si(t)=0 conditioned on Ai,f(i)(t).

$$\psi: A_{i,f(i)}(t) \to \phi \quad (12)$$

Eq. (12) is the mapping from the context pixels $A_{i,f(i)}(t)$ of the symbol pixel, e.g., 10 binary values, to the probability value q. The meaning of φ is the conditional probability of $S_i(t)=0$ conditioned on the values of $A_{i,f(i)}(t)$.

$$\phi \in (0,1) \quad (13)$$

Since the conditional distribution of Si(t) is binomial, with the function ψ, the conditional probability of Si(t) can be estimated as $$\hat{P}_s(S_i(t)|A_{i,f(i)})(t)) = [\psi(A_{i,g(i)})(t))]^{(1-S_i(t))}[1-\psi(A_{i,g(i)}(t))]^{S_i(t)} \quad (14)$$

Figure 4:
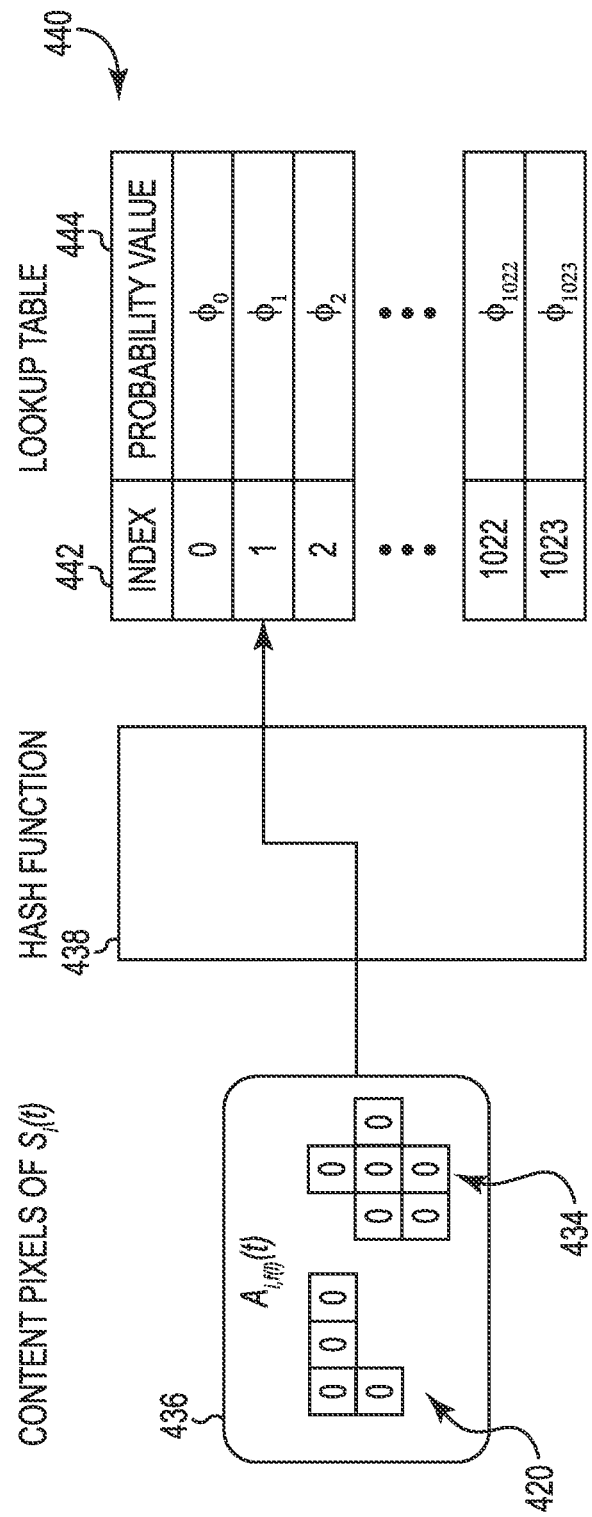
FIG. 4 is a diagram illustrating estimation of conditional probability from symbol neighborhood and dictionary entry neighborhood using a hash table according to an example of the present disclosure.

The term $S_i(t)$ is a scalar-valued quantity, and the term $S_i$ is a vector contained in the bitmap of the symbol. Therefore, with respect to Eq. (14), the term on the left side is the conditional probability of symbol pixel.
When $S_i(t)=1$, $\hat{P}_s(S_i(t)|A_{i,f(i)}(t))=[1-\psi(A_{i,f(i)}(t))]^1$
When $S_1(t)=0$, $\hat{P}_s(S_i(t)|A_{i,f(i)}(t))=[\psi(A_{i,f(i)}(t))]^1$ FIG. 4 is a diagram illustrating estimation of conditional probability from symbol neighborhood and dictionary entry neighborhood using a hash table according to an example of the present disclosure. The following discussion presents the function type/model chosen for the ψ, and describes how to estimate the parameters of the function ψ. According to various embodiments of the present disclosure, a hash table is chosen to construct the function ψ. However, embodiments of the present disclosure are not limited to use of a hash table, and other methods for correlation may be utilized. Some of the advantages for using a hash table include that the estimation provided by a hash table can be accurate enough to construct the optimal dictionary. One-to-one hash table mapping (also known as index mapping) can be used, which is known to be much more efficient than other possible function types, such as linear or polynomial functions of pixel values.

FIG. 4 shows the content of pixels $S_i(t)$ 436, comprising a symbol neighborhood template 420 and a dictionary entry neighborhood template 434, being associated with a lookup table 440 via a hashing function, shown at 438. The lookup table 440 includes a number of indices 442 and corresponding probability values 444. Lookup table 440 is shown to have 1024 index entries, e.g., 0 to 1023, corresponding to each of the possible binary values that are possible based on the 10 pixels included in the symbol neighborhood template 420 and a dictionary entry neighborhood template 434. Hash table 438 implements a one-to-one mapping hash function corresponding to the 10 binary values of Ai,f(i)(t) that can have 1024 possible combinations.

As shown in Eq. (12), the hash table is used to set up the mapping between Ai,f(i)(t) and the corresponding conditional probability. The hash table refers to the entire mapping. In this case, the hash table is the mapping from the context neighborhood, e.g., context pixels of $S_i(t)$ shown on the right side of FIG. 4, to the conditional probability, φ. The hash table comprises two parts, a hash function and a lookup table. The hash function is used to transfer the keys, context pixels, ten binary pixel values of Ai,f(i)(t) to the index, e.g., an integer value z, of the lookup table.

$$Z: A_{i,f(i)}(t) \to z \quad (15)$$

where Z denotes the hash function.

$$z \in (0,1,\ldots,1023) \quad (16)$$

The index z belongs to the set $\{0, 1, \ldots, 1023\}$ because a one-to-one mapping hash function is used, and 10 binary values of Ai,f(i)(t) have overall 1024 possible cases. The index $z=Z(A_{i,f(i)}(t))$ is called as the "reference context value" of the pixel Si(t).

With the reference context value of the pixel Si(t), the conditional probability of Si(t)=0 can be obtained using the lookup table. The lookup table maintains the one-to-one mapping relationship between the index z and $\hat{P}_s(S_i(t)=0|Z(A_{i,f(i)}(t))=z$. More specifically, the lookup table contains an array with 1024 elements, each of which contains the index value z and the associated conditional probability value $\phi_z$.

The construction of the function ψ involves estimating the parameters $\phi=\{\phi_z|z=(0, 1, \ldots, 1023\}$. Experiments have shown that the parameters φ are the property of the binary document image. For example, binary document images with different typefaces, font sizes or scanned using different instruments can have different values of φ. Therefore, for each binary document image, a temporary dictionary $\dot{D}$ can be constructed and a training procedure conducted to estimate the parameters φ. The training procedure is described as follows.

In order to construct training samples for the training procedure, a temporary dictionary $\dot{D}$ can be created. The following provides an example about how to construct the temporary dictionary. However, embodiments of the present disclosure are not limited to this temporary dictionary construction method. For the ith symbol, one symbol Si can be randomly selected that satisfies the following conditions:

$$d_{XOR}(S_i, S_{i'}) < T_{TRAIN} \quad (17)$$

$$w_i^s = w_{i'}^s, \quad (18)$$

where $W_i^s$ is the width of the $i^{th}$ symbol, and $W_{i'}^s$ is the width of the $I'^{th}$ symbol.

$$h_i^s = h_{i'}^s, \quad (19)$$

where $h_i^s$ is the height of the $i^{th}$ symbol, and $h_{i'}^s$ is the height of the $I'^{th}$ symbol. The value of the threshold $T_{Train}$ can be chosen to be 0.06, for example. The temporary dictionary entry associated with the ith symbol can be constructed by copying the bitmap $S_{i'}$ to $D_{g(i)}$.

$$\dot{D}_{g(i)} \leftarrow S_{i'} \quad (20)$$

$$w_{g(i)}^d \leftarrow w_i^s \quad (21)$$

$$h_{g(i)}^d \leftarrow h_i^s \quad (22)$$

where g(i) is the index of the temporary dictionary entry associated with the ith symbol.

The parameter φ can be estimated by maximizing the following posterior distribution:

$$\prod_{i=1}^{N} \prod_{t \in \{0, \ldots w_i^S-1\} \times \{0, \ldots h_i^S-1\}} [\psi(A_{i,g(t)}(t))]^{(1-S_i(t))} [1 - \psi(A_{i,g(t)}(t))]^{S_i(t)} p(\phi) \quad (23)$$

The posterior distribution is the product of the prior term and the likelihood term. The term $p(\phi)$ is the prior distribution of $\phi$, with the following probability density function:

$$p(\phi) \propto \prod_{z=0}^{1023} \phi_z (1-\phi_z) \quad (24)$$

The term $$\prod_{i=1}^{N} \prod_{t \in \{0, \ldots w_i^S-1\} \times \{0, \ldots h_i^S-1\}} [\psi(A_{i,g(t)}(t))]^{(1-S_i(t))} [1 - \psi(A_{i,g(t)}(t))]^{S_i(t)}$$

is the likelihood term because, according to Eq. (14), given $\phi$, the term $[\psi(A_{i,g(t)}(t))]^{(1-S_i(t))}[1-\psi(A_{i,g(t)}(t))]^{S_i(t)}$ is the conditional probability of $Si(t)$ conditioned on $Ai,f(i)(t)$.

The maximum of Eq. (23) is achieved when:

$$\phi_z = \frac{N_0(z) + 1}{N_A(z) + 2} \quad (25)$$

$$z = \{0, 1, \ldots, 1023\} \quad (26)$$

where NA(z) is the number of symbol bitmap pixels with the reference context value z, and N0(z) is the number of 0-valued symbol bitmap pixels with the reference context value z. Obtaining the values of NA(z) and N0(z) can be implemented, for example, by executing the following routine on a computing system:

```
Initialization: i = 1, Na(z) = 0, N0(z) = 0
while i ≤ N do
    if Z(A_{i,f(i)}(t)) = z then
        N_A(z) ← N_A(z) + 1
        if Si(t) = 0 then
            N_0(z) ← N_0(z) + 1
        end if
    end if
    i ← i + 1
end while.
```

With the function $\psi$ constructed, the number of bits used to encode the symbol Si can be approximated using its associated dictionary entry Df(i). Notice that the Df(i) is usually different from the temporary dictionary entry $\dot{D}_{g(i)}$ used in the training process. The approximation of Rs(Si|Df(i)) can be obtained by using Eq. (14) to estimate the conditional probability Ps=(Si(t)|Ai,f(i)(t)), and using Eqs. (10) and (11) to get the number of bits approximation.

The dictionary (comprising dictionary entries) can be further optimized. Dictionary optimization can include two aspects. One aspect is to construct the best dictionary entry set $\{Dj\}M\ j=1$, and the other aspect is to select the optimal dictionary entry Dj for each of the symbols being encoded. For lossless encoding, where no distortion is considered, dictionary optimization can be achieved by minimizing the number of bits to encode the binary document image, shown in Eq. (1).

The following discussion models the dictionary optimization problem as a non-Euclidean space clustering problem. The set of symbols associated with the same dictionary entries are considered as a "cluster", with the dictionary entries being the representatives for each cluster. A modified agglomerative clustering technique is used in determining clustering, which can be faster than standard agglomerative clustering and suitable for the non-Euclidean space.

Dictionary optimization can involve minimizing the overall number of bits in Eq. (1). Since the function Rs(Si|Df(i)) is computationally expensive, the function Rs(Si|Df(i)) is substituted with the approximation provided in Eq. (11), which yields the following approximated cost function:

$$\tilde{R}_1(D, f) \cong \sum_{i=1}^{N} \left[ \tilde{R}_s(S_i \mid D_{f(i)}) + C_1 + \log_2(M) \right] + \sum_{j=1}^{M} [R_d(D_j) + C_2] \quad (27)$$

Minimizing Eq. (27) according to D and f can generate the optimal dictionary:

$$(\tilde{D}^*, \tilde{f}^*) = \underset{D,f}{\operatorname{argmin}} \tilde{R}_i(D, f) \quad (28)$$

However, the minimization in Eq. (28) according to D and f directly can still be NP-hard. In order to make the minimization practical, the minimization can be modeled as a clustering problem by first re-organizing the terms in Eq. (27):

$$\tilde{R}_t(D, f) \cong \quad (29)$$

$$\sum_{j=1}^{M} \left[ \sum_{\{i|f(i)=j\}} \tilde{R}_s(S_i \mid D_j) \right] + \sum_{j=1}^{M} [R_d(D_j) + NC_1 + N\log_2(M) + MC_2]$$

The above Eq. (29) can be considered as the cost function of a non-Euclidean space clustering. More specifically, clustering involves minimizing Eq. (29), and merging symbols into entropy-clusters, $\{Dj\}M\ j=1$. The jth entropy-cluster, $D_j$, is defined as the set of symbols associated with the same jth dictionary entry:

$$\mathcal{D}_j = \{S_i | f(i) = j\} \quad (30)$$

Each entropy-cluster (which is a set of symbols) uses one dictionary $D_j$ as the cluster representative (codeword).

With the definition of the entropy-cluster, Eq. (29) can be considered as the summation of the intra-cluster distortion and the penalty of the number of clusters. The approximated number of bits to encode all the symbols using associated dictionary entries, $$\sum_{j=1}^{M} \left[ \sum_{\{i|f(i)=j\}} \tilde{R}_s(S_i \mid D_j) \right],$$

can be recognized as the intra-cluster distortion in the clustering. The more dictionary entries a dictionary contains, potentially the better dictionary entries that can be found for symbols. Therefore, the intra-cluster distortion generally decreases with relatively more dictionary entries. The approximated number of bits in the term $$\sum_{j=1}^{M}[R_d(D_j)+NC_1+N\log_2(M)+MC_2]$$

can be recognized as the penalty in the clustering and generally increases when the number of entropy-clusters (dictionary entries) increases. The term NC1 can be considered as a constant given the symbol set extracted from the binary image. Therefore, dictionary optimization can be the optimal trade-off between intra-cluster distortion and clustering penalty.

The bitstream minimization problem is modeled as a clustering problem. A bottom-up agglomerative clustering technique is described here as an example. However, embodiments of the present disclosure are not limited to the bottom-up agglomerative clustering technique. Because this minimization is modeled as clustering, a bottom-up agglomerative clustering technique can be used to optimize the dictionary. The clustering is performed in non-Euclidean space; therefore, how clusters to merge are chosen, and how clusters are merged, can be different from previous approaches to agglomerative clustering in Euclidean space. According to embodiments of the present disclosure, a stopping criteria can be used for this application. A method for clustering is presented in the following discussion.

1. In initializing a method for clustering, it is known that every symbol forms a singleton entropy-cluster, and the symbol itself is the representative of the entropy cluster it formed. In other words, at the beginning, each symbol uses itself as the associated dictionary entry. At initialization, the intra-cluster distortion is very small since the symbols are associated with dictionary entries that are exactly the same as themselves, while the cluster number penalty is relatively large. Therefore, entropy-clusters can be iteratively merged to decrease the penalty term at the cost of increasing a little the intra-cluster distortion.

2. Entropy-clusters to merge can be iteratively chosen. For example, two entropy-clusters, $D_j$ and $D_{j'}$, to be merged, can be chosen by the following strategy:

$$\{\hat{j},\hat{j}'\} = \min_{\{j,j'\}} -\sum_{S_i\in D_j}[\tilde{R}_s(S_i|D_j)] - \sum_{S_i\in D_{j'}}\tilde{R}_s(S_i|D_{j'}) + \sum_{S_i\in\{D_j^U D_{j'}\}}\tilde{R}_s(S_i|D_j) \quad (31)$$

Eq. (31) can be used minimize the intra-cluster distortion increased by the entropy-cluster merging. The first two terms are the intra-cluster distortion before the entropy-clusters merged. The last term is the intra-cluster distortion after the entropy-clusters merged. As shown in Eq. (31), the first term $$\sum_{S_i\in D_j}[\tilde{R}_s(S_i|D_j)]$$

is the approximated number of bits to encode the symbols in the entropy-cluster Dj using the dictionary entry Dj, while the second term $$\sum_{S_i\in D_{j'}}\tilde{R}_s(S_i|D_{j'})$$

is the approximated number of bits to encode the symbols in the entropy-cluster Dj' using the dictionary entry Dj. The third term $$\sum_{S_i\in\{D_j^U D_{j'}\}}\tilde{R}_s(S_i|D_j)$$

is the approximated number of bits to encode all the symbols in either Dj or Dj' using the dictionary entry Dj. Therefore, the right side of Eq. (31) is the number of bits increased due to the entropy-cluster merging.

3. The two entropy-clusters chosen can be merged. The new entropy-cluster can be the union of $D\hat{j}$ and $D\hat{j}'$. The dictionary entry $D\hat{j}$ can be used as the cluster representative for the new merged entropy-cluster because in the last term of Eq. (31), using $D\hat{j}$ as the dictionary entry for the new merged entropy-cluster minimizes the increase of the intra-cluster distortion.

4. Entropy-clusters can be iteratively merged, as described above, until the right hand side of Eq. (31) is not smaller than a threshold, Ts. The value of Ts can be, for example, equal to the decrease of the penalty in Eq. (29) caused by the merging operation. In this way, the overall approximated number of bits, e.g., Eq. (29), can keep monotonically decreasing during clustering. The merging operation described above increases the intra-cluster distortion, and decreases the penalty term. The stop criteria can constrain the increase of the intra-cluster distortion to be smaller than, or equal to, the decrease of the penalty term. The value of Ts can be determined as follows.

The removed dictionary entry can be annotated as DM+1. The number of bits decreased in the penalty part of (29) can be calculated by:

$$T_s=R_d(D_{M+1})+N\log_2(M+1)+(M+1)C_2-(N\log_2(M)+MC_2) \quad (32)$$

The term Rd(DM+1) can be approximated by:

$$\hat{R}_d(D_{M+1}) \cong \frac{w_{M+1}^d h_{M+1}^d}{4} \quad (33)$$

The term $N\log_2(M+1)+(M+1)C_2-(N\log_2(M)+MC_2)$ can be approximated by:

$$N\log_2(M+1)+(M+1)C_2-(N\log_2(M)+MC_2) \cong \frac{N}{M}+C_2 \quad (34)$$

The empirical value of $$\frac{N}{M}$$

used here is 6.5, and the empirical value used for C2 is 2.5. However, embodiments of the present disclosure are not limited to the values used for these constants associated with overheads. According to the process described above, during clustering the approximated JBIG2 bit-stream size, provided in Eq. (29), can keep monotonically decreasing until a minimization point is determined. Minimization points can be local.

In order to reduce the computational cost, CEE is only calculated for a subset of all the symbol and dictionary entry pairs. The subset is selected according to the following conditions:

1, the symbol and the dictionary entry should have the same size;

2, the symbol and the dictionary entry are slightly different. One possible mathematical expression for the condition "the symbol and the dictionary entry are slightly different" is $$T_S \leq d_{XOR}(S_i, D_j) \leq T_L$$

Both the terms $T_S$ and $T_L$ are thresholds and $T_S$ is always smaller than $T_L$.

Two possible solutions are described for this subset selection. The first one is called the prescreening strategy, the second one is called multi-stage clustering. However, embodiments of the present disclosure are not limited to these two strategies.

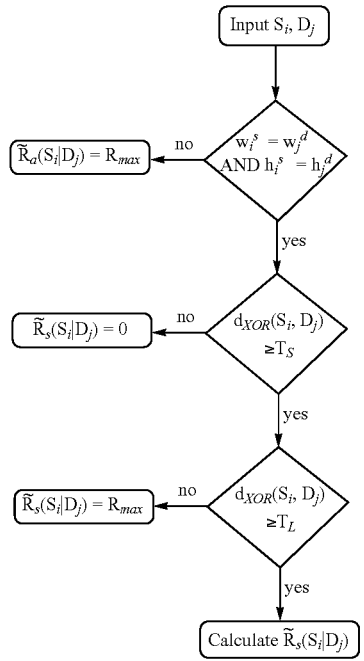

The prescreening procedure is shown above.

In the first prescreening step, if the symbol $S_i$ and the dictionary entry $D_j$ have different sizes, the conditional entropy is not estimated, and the value of $\hat{R}_s(S_i|D_j)$ is set to be $R_{MAX}$. The value of $R_{MAX}$ is 0xFFFF (determined by experiment) and can be much larger than any possible conditional entropy estimation value. Therefore, if the symbol $S_i$ and the dictionary entry $D_j$ have different sizes, symbol $S_i$ cannot use the dictionary entry $D_j$ as the associated dictionary entry.

In the second prescreening step, if the symbol $S_i$ and the dictionary entry $D_j$ are very similar, $T_S > d_{XOR}(S_i, D_j)$, the conditional entropy is not estimated, and the value of $\hat{R}_s(S_i|D_j)$ is set to be 0. The conditional entropy estimation is always larger than zero. Therefore, if $T_S > d_{XOR}(S_i, D_j)$, symbol $S_i$ will use the dictionary entry $D_j$ as the associated dictionary entry.

In the third prescreening step, if the symbol S$_i$ and the dictionary entry $D_j$ is very different, $T_S > d_{XOR}(S_i, D_j) > T_L$, the conditional entropy is not estimated, and the value of $\tilde{R}_s(S_i|D_j)$ is set to be $R_{MAX}$, which means, symbol $S_i$ cannot use the dictionary entry $D_j$ as the associated dictionary entry, if $$T_S > d_{XOR}(S_i, D_j) > T_L$$

Another possible solution is multi-stage clustering.

Figure 5:
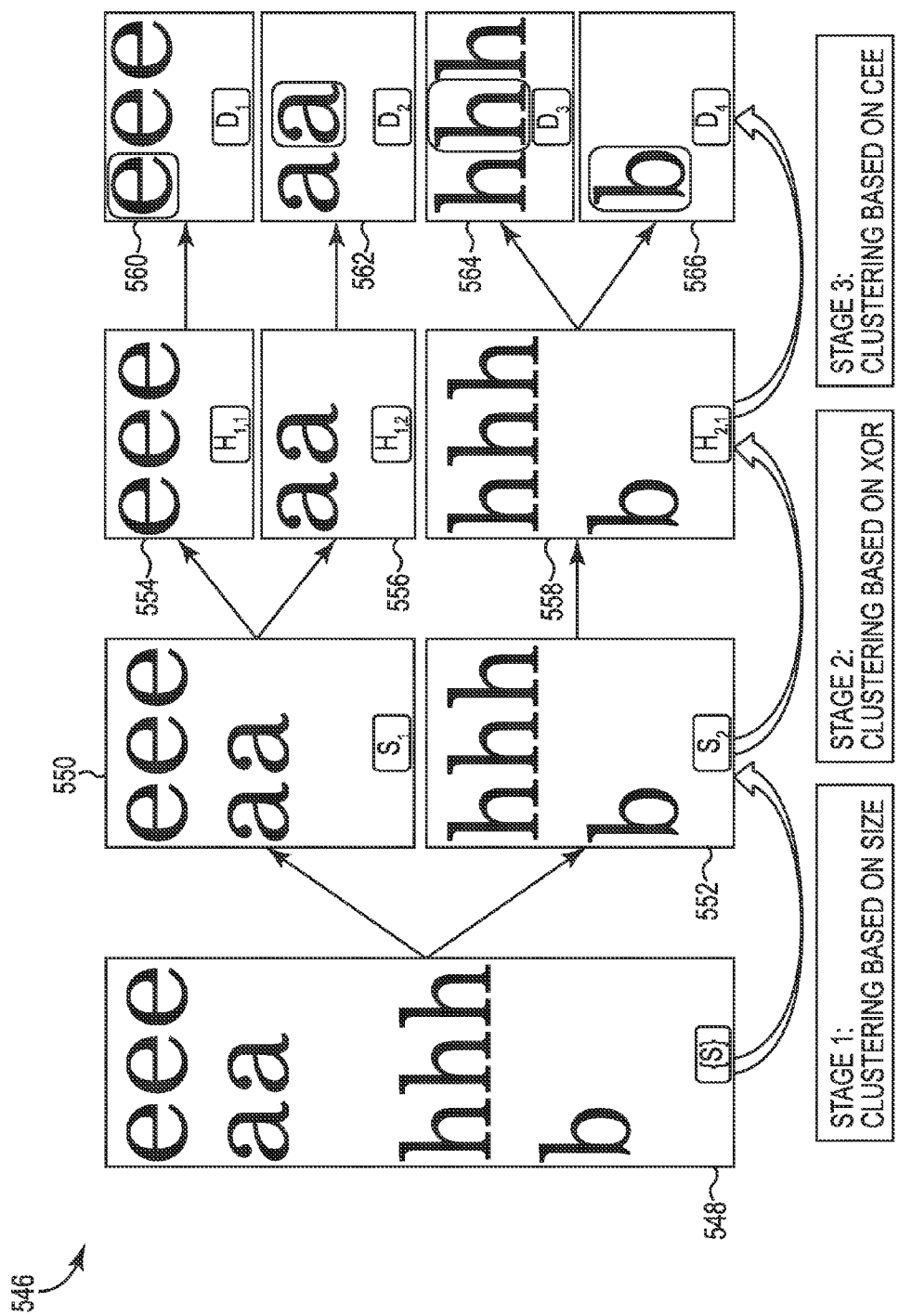
FIG. 5 is a diagram illustrating multistage clustering according to an example of the present disclosure.

FIG. 5 is a diagram illustrating multistage clustering according to an example of the present disclosure. Fast dictionary construction is a practical consideration. An example symbol quantity for one binary document image, e.g., on a page, can be around 3000. Therefore, the computational cost can be high when Eq. (31) is calculated. In order to reduce the computational cost, a multistage clustering strategy can be utilized.

FIG. 5 illustrates a multi-stage clustering 546 strategy that can categorize symbols into small subgroups, and then perform the number of bits minimization described above within each subgroup to construct an optimal dictionary. Three stages of clustering are shown in FIG. 5. Stage 1 involves clustering based on symbol size, e.g., from {S} 548 into size subgroups $S_1$ 550 and $S_2$ 552. Stage 2 involves further clustering of each size subgroup based on a Hamming distance, e.g., XOR, into Hamming subgroups, e.g., $H_{1,1}$ 554 and $H_{1,2}$ 556 from size subgroup $S_1$, and $H_{2,1}$ 558 from size subgroup $S_2$. Stage 3 involves clustering based on CEE from each Hamming subgroup. Subgroup $D_1$ 560 is derived from subgroup $H_{1,1}$, subgroup $D_2$ 562 is derived from subgroup $H_{1,2}$, and subgroups $D_3$ 564 and $D_4$ 566 are derived from subgroup $H_{1,2}$. As such, FIG. 5 illustrates nested clustering. However, embodiments of the present disclosure are not so limited and other organizations for multistage clustering can be utilized.

First stage clustering can put the symbols with the same size (in terms of both width and/or height) into a same group, e.g., size-groups. Second stage clustering can be performed within each size-group, and can involve clustering based on a Hamming distance. The result is Hamming subgroups, which can be referred to as h-subgroups.

An output of the first stage clustering can be a partition of the whole symbol set {S}, which can be defined as follows:

$$\{S\} = S_1 \cup S_2 \cup \ldots \cup S_g \cup \ldots \cup S_G \tag{35}$$

The term $S_g$ denotes the $g^{th}$ size-group, which is a set of symbols with the same size. The index g ranges from 1 to G. Notice that $\forall g1$, and $g2$, and $S_{g1} \cap S_{g2} = \Theta$.

The second stage clustering partitions every size-group Sg into h-subgroups, as shown in Eq. (36):

$$S_g = H_{g,1} \cup H_{g,2} \cup \ldots \cup H_{g,I} \cup \ldots \cup H_{g,Lg} \tag{36}$$

The term $H_{g,I}$ denotes the $I^{th}$ h-subgroup in the $g^{th}$ size-group. The index I is the h-subgroup index, and ranges from 1 to $L_g$ for the $g^{th}$ size-group. A fast K-means can be used to accomplish the second stage clustering, for example.

In the third stage clustering, agglomerative clustering (described above) can be performed within every h-subgroup to determine $D_j$, an entropy-cluster/dictionary-cluster.

Figure 6:
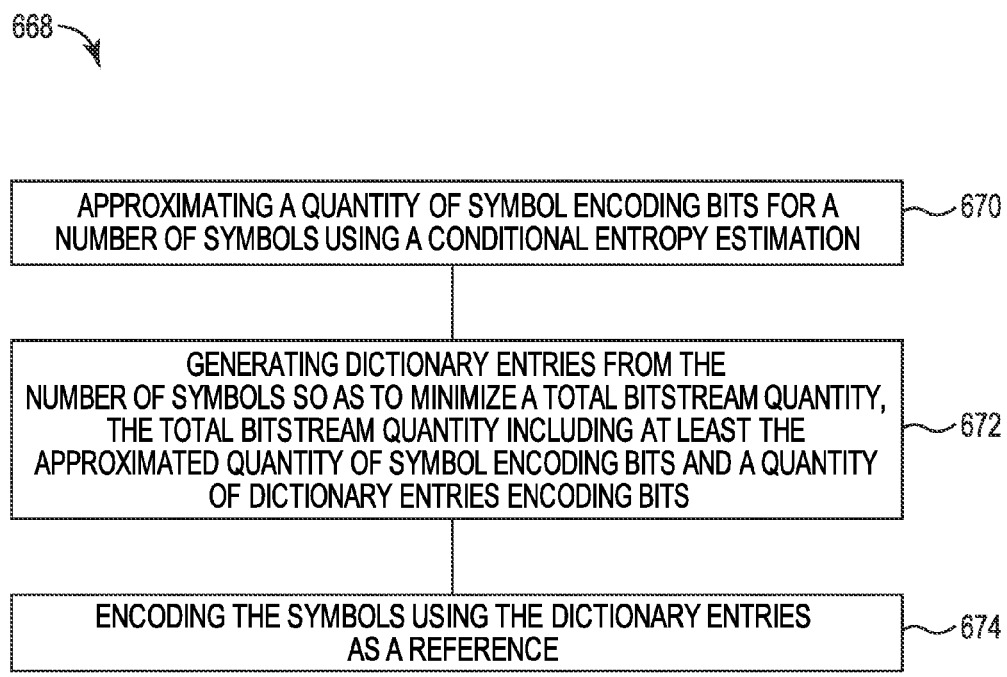
FIG. 6 is a flow chart illustrating an example of a method for symbol compression using conditional entropy estimation according to an example of the present disclosure.

FIG. 6 is a flow chart illustrating an example of a method for symbol compression using conditional entropy estimation 668 according to an example of the present disclosure. As shown at block 670 in the example embodiment of FIG. 6, machine readable instructions can be executed by a processing resource to approximate a plurality of symbol encoding bits for a number of symbols using a conditional entropy estimation at 670. For example, the plurality of symbol encoding bits can be approximated as discussed above with respect to Eq. (11), with the conditional probability of the symbol pixel being encoded conditioned on its context pixels, $A_{i,f(i)(t)}$.

At block 672, the method 668 includes executing program instructions to generate dictionary entries from the number of symbols so as to minimize a total bit-stream. The total bit-stream includes at least the approximated plurality of symbol encoding bits and a plurality of dictionary entries encoding bits, and can include other information, as indicated by Eq. (27). Clustering can be used to minimize the total bit-stream, as discussed above.

At block 674, method 668 includes executing program instructions to encode the symbols using the dictionary entries as a reference. Once the dictionary entries are generated, the associated dictionary entry can be used to skew the probability of symbol pixels. That is, a dictionary is used as a reference and the symbol is defined via the differences for the symbol from the reference dictionary entry.

Figure 7:
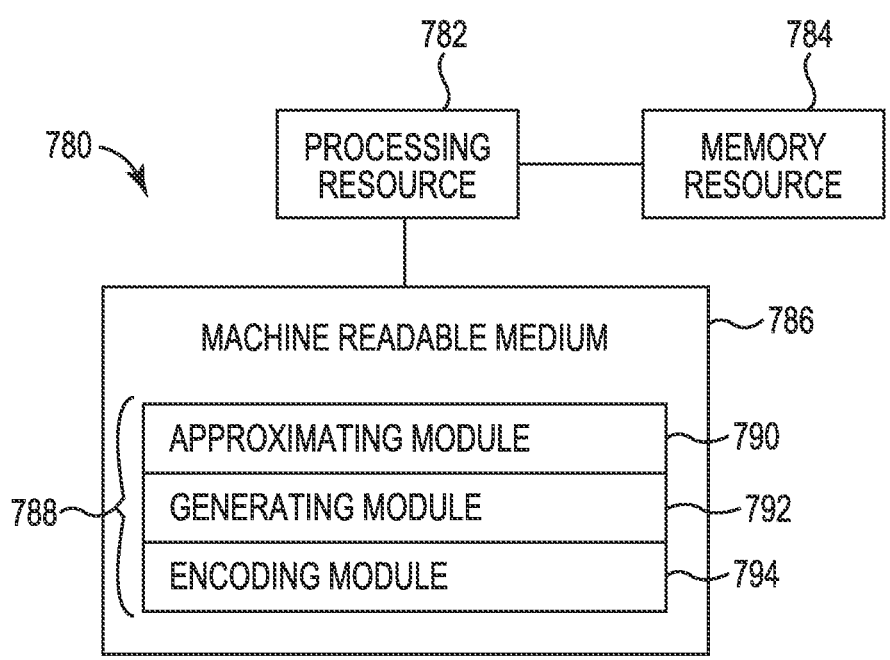
FIG. 7 illustrates an example encoder according to the present disclosure.

FIG. 7 illustrates an example encoder, e.g., computing system according to the present disclosure. The encoder 780 can utilize software, hardware, firmware, and/or logic to perform a number of functions. The encoder 780 can be a combination of hardware and program instructions configured to perform a number of functions. The hardware, for example, can include one or more processing resources 782, machine readable media (MRM) 786, memory resources 784, etc. The program instructions, e.g., machine-readable instructions (MRI) 788, can include instructions stored on the MRM 786 to implement a desired function, and can be organized into various modules, such as an approximating module 790, a generating module 792, and an encoding module 794.

An approximating module 790 can comprise MRI 788 and can be executed by the processing resource 782 to approximate a plurality of symbol encoding bits for a number of symbols using conditional entropy estimation. A generating module 792 can comprise MRI 788 and can be executed by the processing resource 782 to generate dictionary entries from the quantity of symbols. The dictionary entries can be generated so as to minimize a total bit-stream quantity. The total bit-stream quantity can include the approximated plurality of symbol encoding bits and a quantity of dictionary entries encoding bits, and may include bits representing other information, e.g., such as is discussed with respect to Eq. (27). An encoding module 794 can comprise MRI 788 and can be executed by the processing resource 782 to encode the symbols using the dictionary entries as a reference.

The processing resource 782 can be in communication with the tangible non-transitory MRM 786 storing the set of MRI 788 executable by the processing resource 782, to perform the methods described herein. Machine readable instructions can also be stored in remote memory managed by a server and represent an installation package that can be downloaded, installed and executed.

Processing resource 782 can execute MRI 788 that can be stored on internal or external non-transitory MRM 786. The processing resource 782 can execute MRI 788 to perform various functions, including the functions described with respect to the figures of this disclosure, among others.

The modules into which the MRI 788 may be organized can be executed by the processing resource 782 to perform a number of functions. The modules can be sub-modules of other modules, or the modules can comprise individual modules separate and distinct from one another.

The non-transitory MRM 786, as used herein, can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory MRM 786 can be integral or communicatively coupled to the encoder in a wired and/or wireless manner. For example, the non-transitory MRM 786 can be an internal memory, a portable memory, and a portable disk, or a memory associated with another computing resource, e.g., enabling MRIs 788 to be transferred and/or executed across a network such as the Internet.

The MRM 786 can be in communication with the processing resource 782 via a communication path. The communication path can be local or remote to a machine, e.g., a computer, associated with the processing resource 782. Examples of a local communication path can include an electronic bus internal to a machine, e.g., a computer, where the MRM 786 is one of volatile, non-volatile, fixed, and/or removable storage medium in communication with the processing resource 782 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path can be such that the MRM 786 is remote from a processing resource 782, such as in a network connection between the MRM 786 and the processing resource 782. That is, the communication path can be a network connection. Examples of such a network connection can include local area network (LAN), wide area network (WAN), personal area network (PAN), and the Internet, among others. In such examples, the MRM 786 can be associated with a first computing system, e.g., encoder, and the processing resource 782 can be associated with a second computing system, e.g., a server.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

The above-described method for symbol compression using conditional entropy estimation (CEE), including dictionary construction, can be used to predict the number of bits to encode symbols using associated dictionary entries. Experimental results for various kinds of binary document images show that CEE can provide much more accurate prediction with just a little more computation cost compared with previous approaches, including XOR and WXOR. Both the Pearson correlation and the Spearman correlation between CEE and the number of bits is larger than 90%, while previous XOR and WXOR approaches provided a prediction accuracy around 50% in terms of the Pearson correlation and the Spearman correlation.

Experiments also show that the compression ratio of the JBIG2 encoder implementing the dictionary construction of the present disclosure is about 20% higher than the JBIG2 encoders implementing previous approaches to dictionary construction. If the dictionary construction is considered as sparse image representation, the compression ratio improvement indicates that using the presently-disclosed dictionary construction techniques construct a better sparse image representation and make use of the information in the sparse representation more effectively. Furthermore, the prescreening or the multi-stage design of dictionary construction can provide a JBIG2 encoder that is efficient enough to be implanted in an embedded system.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

Various examples of the system and method for symbol compression using conditional entropy estimation have been described in detail with reference to the drawings, where like reference numerals represent like parts and assemblies throughout the several views. Reference to various examples does not limit the scope of the system and method for symbol compression using conditional entropy estimation, which is limited just by the scope of the claims attached hereto. Additionally, any examples set forth in this specification are not intended to be limiting and merely set forth some of the many possible examples for the claimed system and method for collaborative information services.

Throughout the specification and claims, the meanings identified below do not necessarily limit the terms, but merely provide illustrative examples for the terms. The meaning of "a," "an," and "the" includes plural reference, and the meaning of "in" includes "in" and "on." The phrase "in an embodiment," as used herein does not necessarily refer to the same embodiment, although it may.

In the foregoing Detailed Description, some features are grouped together in a single embodiment for the purpose of streamlining the disclosure. This method of disclosure is not to be interpreted as reflecting an intention that the disclosed examples of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for symbol compression using conditional entropy estimation, comprising:
   approximating a plurality of symbol encoding bits for a number of symbols using a conditional entropy estimation;
   generating dictionary entries from the number of symbols so as to minimize a total bit-stream, the total bit-stream including at least the approximated plurality of symbol encoding bits and a plurality of dictionary entries encoding bits; and
   encoding the number of symbols using the dictionary entries as a reference.

2. The method according to claim 1, further comprising:
   segmenting a text region from an image of digital content; and
   extracting from the text region connected components as symbols.

3. The method according to claim 1, wherein approximating the plurality of symbol encoding bits for the number of symbols includes estimating for each symbol the conditional probability of a pixel in the symbol conditioned on a context of the pixel in the symbol.

4. The method according to claim 3, wherein the context of the pixel includes pixels the symbol neighborhood and pixels in the dictionary entry neighborhood for a dictionary entry used as a reference for the pixel in the symbol.

5. The method according to claim 3, wherein the context of the pixel includes 4 pixels of the symbol neighborhood that are located:
   diagonally above and to the left of the pixel in the symbol;
   above the pixel in the symbol;
   diagonally above and to the right of the pixel in the symbol; and
   to the left of the pixel in the symbol.

6. The method according to claim 3, wherein the context of the pixel includes 6 pixels of the dictionary entry neighborhood for the dictionary entry used as the reference for the pixel in the symbol that are located:
   as the center pixel of the dictionary entry;
   above the center pixel of the dictionary entry;
   to the left of the center pixel of the dictionary entry;
   to the right of the center pixel of the dictionary entry;
   diagonally below and to the left of the center pixel of the dictionary entry; and
   below the center pixel of the dictionary entry.

7. The method according to claim 3, wherein estimating for each symbol the conditional probability includes correlating the context of the pixel to a lookup table of indexed probability values via a hash function, wherein the lookup table includes 1024 elements.

8. The method according to claim 1, wherein generating dictionary entries from the quantity of symbols so as to minimize a total bit-stream includes clustering the symbols into subgroups by a prescreening or multistage clustering process, with a last stage of clustering being based on conditional entropy estimation, the dictionary entries corresponding to subgroups.

9. The method according to claim 8, wherein clustering the symbols into subgroups by a multistage clustering process includes:
   clustering symbols in a first stage into size subgroups based on symbol size;
   clustering symbols of each size subgroup based on Hamming distance; and
   clustering symbols of each Hamming distance subgroup into entropy subgroups based on conditional entropy estimation.

10. The method according to claim 9, further comprising selecting a representative character from each of the entropy subgroups as a dictionary entry.

11. The method according to claim 10, further comprising iteratively merging entropy subgroups selected to minimize intra-distortion increased by entropy-cluster merging.

12. A non-transitory machine-readable medium having machine-readable instructions stored thereon that, if executed by a processing resource, cause the processing resource to:
- estimate a conditional probability of a pixel of a symbol to be encoded conditioned on its context pixels;
- approximate a plurality of symbol encoding bits for a number of symbols using the estimated conditional probability;
- generate dictionary entries from the plurality of symbols in a manner that minimizes a total bit-stream that includes the approximated plurality of symbol encoding bits and a plurality of dictionary entries encoding bits; and
- encode the symbols using the dictionary entries as a reference.

13. The non-transitory computer-readable medium of claim 12, further comprising machine-readable instructions stored thereon that, if executed by the processing resource, cause the processing resource to:
- select dictionary entries from entropy clusters determined by a multistage clustering process based on symbol size, XOR, and conditional entropy estimation clustering stages.

14. An encoder, comprising:
- a computing system having a processing resource; and
- a non-transitory machine-readable medium having machine-readable instructions stored thereon that, if executed by the processing resource, cause the processing resource to:
  - approximate a plurality of symbol encoding bits for a number of symbols using a conditional entropy estimation;
  - generate dictionary entries from the plurality of symbols so as to minimize a total bit-stream, the total bit-stream including at least the approximated plurality of symbol encoding bits and a quantity of dictionary entries encoding bits; and
  - encode the symbols using the dictionary entries as a reference.

15. The encoder of claim 14, wherein machine-readable instructions to approximate a quantity of symbol encoding include machine-readable instructions to:
- estimate a conditional probability of a pixel of a symbol to be encoded conditioned on its context pixels;
- calculate information contained in the pixel of the symbol; and
- approximate the plurality of symbol encoding bits to encode the symbol using its associated dictionary entry.

* * * * *

UNITED STATES PATENT AND TRADEMARK OFFICE
CERTIFICATE OF CORRECTION

PATENT NO.        : 9,020,262 B2
APPLICATION NO.   : 13/563426
DATED             : April 28, 2015
INVENTOR(S)       : Dejan Depalov et al.

It is certified that error appears in the above-identified patent and that said Letters Patent is hereby corrected as shown below:

Title page Primary Examiner, in column 2, line 1, delete "Kanjibhal Patel" and insert -- Kanjibhai Patel --, therefor.

Signed and Sealed this
Fifteenth Day of March, 2016

Michelle K. Lee
*Director of the United States Patent and Trademark Office*